United States Patent Office 3,146,140
Patented Aug. 25, 1964

3,146,140
COMPOSITION COMPRISING TRINITROTOLUENE AND o-NITROPHENOL
Virgil I. Milani, Silver Spring, Md., assignor to the United States of America as represented by the Secretary of the Navy
No Drawing. Filed June 26, 1961, Ser. No. 120,469
6 Claims. (Cl. 149—107)
(Granted under Title 35, U.S. Code (1952), sec. 266)

The invention described herein may be manufactured and used by or for the Government of the United States of America for governmental purposes without the payment of any royalties thereon or therefor.

This invention relates to explosives; more specifically it relates to cast explosives having improved resistance to irreversible growth and cracking.

Two problems associated with TNT-containing explosives, upon being temperature cycled, are irreversible growth and cracking, which cause well-known unwanted consequences. There have been various attempts to solve these problems such as the addition of waxes and additives to lower the modulus of elasticity of the explosive, and the addition of substances which form high melting eutectics with TNT.

Varying degrees of success have been achieved with additives such as 2,4-dinitroanisole, 2,4,6-trinitroanisole cyclohexanone, 2,4-dinitrotoluene, o-nitrotoluene, p-nitrotoluene, mixtures of o- and p-nitrotoluene, anthracene, and phenanthrene.

There are problems associated with the use of such additives however, and a penalty must usually be paid for each such use. Anthracene for example is suitable for small casts as an anti-cracking agent, but is not suitable for such use in large casts, five inches or more in diameter. An additive may eliminate or significantly reduce either growth or cracking, but not both; in fact, it may significantly reduce one while actually promoting the other.

It is therefore an object of this invention to provide cast TNT-containing explosives which have better crack and growth resistance characteristics than anything heretofore known in the art.

This object is accomplished by incorporating the additive o-nitrophenol, into the explosive. Such an improved emplosive composition is easily made by melting the TNT-containing expolsive, adding the additive, stirring slightly, and allowing the additive to distribute itself evenly throughout the melt. Thereafter the melt is poured into a mold which has been preheated to a temperature about 20–25° C. below the temperature of the melt. Thereafter the cast is allowed to continue cooling at room temperature. Casts so prepared are then ready for machining into precise shapes to fit into explosive devices.

The use of ortho-nitrophenol, melting point 45° C., is critical for purposes of this invention; the meta- and para-isomers having melting points of 96° C. and 114° C. respectively, are unsatisfactory because their melting points are too high which circumstance tends to create brittleness which defeats the purpose of this invention. In Table 1 which follows, data are presented showing the efficacy of o-nitrophenol compared with a number of best known additives when amount of ½% are incorporated into a standard military explosive containing 55.2% cyclotrimethylenetrinitramine (RDX), 40% trinitrotoluene (TNT), 1.2% polyisobutylene, and 3.6% wax:

TABLE 1
*Irreversible Growth of Comp. B Containing Various Additives*

| I | II | III | IV | V | VI | VII | VIII | IX | X |
|---|---|---|---|---|---|---|---|---|---|
| Additive in comp. B | No. of cycles before breaking | Total growth in thickness on 31st cycle (in 0.001") | Total growth in diameter on 31st cycle (average) (in 0.001") | Total growth in thickness on 53rd cycle (in 0.001") | Total growth in thickness on breaking (in 0.001") | Total growth in diameter on breaking (average) (in 0.001") | Total growth in thickness 53rd cycle | Exudation (qualitative) | No. of major or critical cracks |
| 2,4-dinitroanisole | 14 | | | | 9(0.35%) | 19(0.38%) | | Low | 8 |
| Cyclohexanone | 21 | | | | 41(1.63%) | 59(2.35%) | | High | 6 |
| 2,4-dinitrotoluene | 28 | | | 68(2.68%) | 15(0.59%) | 22(0.44%) | | Low | 4 |
| o-Nitrotoluene | 31 | 34(1.32%) | 62(1.24%) | 106(4.16%) | 34(1.32%) | 62(1.24%) | 68 | High | 3 |
| ONT/PNT* | 31 | 28(1.09%) | 48(0.96%) | 98(3.84%) | 28(1.09%) | 48(0.96%) | 106 | High | 3 |
| p-Nitrotoluene | 32 | 20(0.78%) | 35(0.71%) | 85(3.34%) | 23(0.90%) | 39(0.78%) | 98 | Low | 3 |
| p-Methoxybenzyl alcohol | 34 | 25(0.98%) | 46(0.92%) | 78(3.07%) | 31(1.22%) | 62(1.24%) | 85 | Medium | 4 |
| o-Nitrophenol | 53 | 17(0.66%) | 22(0.44%) | 76(2.98%) | 76(2.98%) | 107(2.14%) | 78 | Low | 3 |

*o-Nitrotoluene 50% and p-Nitrotoluene 50%.

Each sample represents a disk of cast material, prepared according to the foregoing casting technique, five inches in diameter and two and one-half inches thick. The samples were tested by cycling them between magazine temperatures (about 25° C. in summer and 4° C. in winter) and an even temperature of 70–74° C.

After being left in a magazine all night, the samples were removed, their thicknesses and diameters measured, and placed in an oven at room temperature. The oven was then brought up to 70°–74° C. in about three-fourths to one hour's time, and the samples left at that temperature all day (8 hours). At the end of the day, the samples were removed from the oven, placed in wood shavings or paper bags, and returned to the magazine. The next morning they were remeasured and any increase in size noted. Such a procedure constituted one cycle.

Upon being put through the aforementioned cycle a number of times, cracks began to develop on the flat surfaces. These cracks almost invariably started from the center of a surface and became deep enough to reach the opposite surface. Ultimately the disks broke up into two, three, four, or more sections, like slices of pie.

No difficulty was encountered in measuring the thicknesses of the disks; it could be done even though the disk of material had fallen apart. The measurement of diameters was more complicated since the cracks in the samples were always wider in the middle than at the periphery. Thus the measurement parallel to the crack was always smaller than the one at right angles to the crack; accordingly two or more diameter measurements were taken and these averaged.

Exudation of additive and perhaps other ingredients from the cast is a phenomenon that accompanies temperature cycling of cast TNT-containing explosives.

It is apparent that o-nitrophenol is superior to the other additives as a crack inhibitor because the disk containing it did not break apart until the 53rd cycle, while the next best lasted only 34 cycles. Its growth inhibiting qualities are superior to the other samples as evidenced by the data in columns III, IV and VIII. As indicated in the table, its exudation qualities are equal to the best of the other additives.

Although the samples incorporating o-nitrophenol contain only one-half percent, it is obvious that the invention is not limited to such amounts. Any amount conventionally added may be used but it is usually not desirable to incorporate more than one percent.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A composition of matter comprising trinitrotoluene and ortho-nitrophenol.

2. A composition of matter comprising an explosive containing trinitrotoluene and ortho-nitrophenol.

3. A composition of matter comprising 55.2% cyclotrimethylenetrinitramine (RDX), 40% trinitrotoluene (TNT) and 3.6% wax and ortho-nitrophenol.

4. The composition of claim 3 in which ortho-nitrophenol is present in an amount up to about one percent.

5. The process of rendering TNT-containing explosive compositions resistant to cracking and irreversible growth upon being temperature cycled which comprises melting said explosive composition, incorporating ortho-nitrophenol therein, stirring the mixture slightly and allowing the ortho-nitrophenol to evenly distribute itself throughout the melt.

6. The process of claim 5 in which the ortho-nitrophenol is added in an amount up to about one percent by weight.

References Cited in the file of this patent

UNITED STATES PATENTS 829,362     Barthelemy _____ Aug. 21, 1906

FOREIGN PATENTS 129,356     Australia _____ Oct. 8, 1948